(12) United States Patent
Van Marion et al.

(10) Patent No.: US 8,097,678 B2
(45) Date of Patent: *Jan. 17, 2012

(54) OUTER SHEATH LAYER FOR POWER OR COMMUNICATION CABLE

(75) Inventors: Remko Van Marion, Vienna (AT); Roger Carlsson, Säve (SE); Hans Eklind, Stenungsund (SE); Irene Helland, Porsgrunn (NO)

(73) Assignee: Borealis Technology OY, Porvoo (FI)

( * ) Notice: Subject to any disclaimer, the term of this patent is extended or adjusted under 35 U.S.C. 154(b) by 902 days.

This patent is subject to a terminal disclaimer.

(21) Appl. No.: 11/993,761

(22) PCT Filed: Jun. 28, 2006

(86) PCT No.: PCT/EP2006/006266
§ 371 (c)(1),
(2), (4) Date: May 27, 2008

(87) PCT Pub. No.: WO2007/003322
PCT Pub. Date: Jan. 11, 2007

(65) Prior Publication Data
US 2010/0047440 A1   Feb. 25, 2010

(30) Foreign Application Priority Data
Jun. 30, 2005   (EP) .................................... 05014216

(51) Int. Cl.
*C08F 8/00* (2006.01)
*C08L 23/00* (2006.01)
*C08L 23/04* (2006.01)

(52) U.S. Cl. ........................................ 525/191; 525/240
(58) Field of Classification Search .................. 525/191, 525/240
See application file for complete search history.

(56) References Cited

U.S. PATENT DOCUMENTS 7,579,551 B2 *   8/2009   Van Marion et al. ..... 174/110 R

FOREIGN PATENT DOCUMENTS

| EP | 0 517 868 | 11/1995 |
|----|-----------|---------|
| EP | 0 688 794 | 8/1998 |
| EP | 0 907 682 | 11/2000 |
| EP | 1 267 189 | 12/2002 |
| EP | 0 810 235 | 11/2004 |
| RU | 2 137 788 | 9/1999 |
| RU | 2 179 558 | 12/2000 |
| WO | WO 97/47682 | 12/1997 |
| WO | WO 00/22040 | 4/2000 |

OTHER PUBLICATIONS

International Search Report for International Application No. PCT/EP2006/006266.

* cited by examiner

*Primary Examiner* — Nathan M Nutter
(74) *Attorney, Agent, or Firm* — Fay Sharpe LLP

(57) ABSTRACT

The present invention relates to a polyethylene composition, comprising a base resin which comprises (i) a first fraction which is an ethylene homo- or copolymer, and (ii) a second fraction which is an ethylene copolymer, wherein the first fraction (i) has a lower weight average molecular weight than the second fraction (ii), and the base resin has a density of less than 0.940 g/cm3 and a shear thinning index $SHI_{2.7/210}$ of at least 25.

30 Claims, 1 Drawing Sheet

Fig.1: Extruder pressure as a function of MFR 21
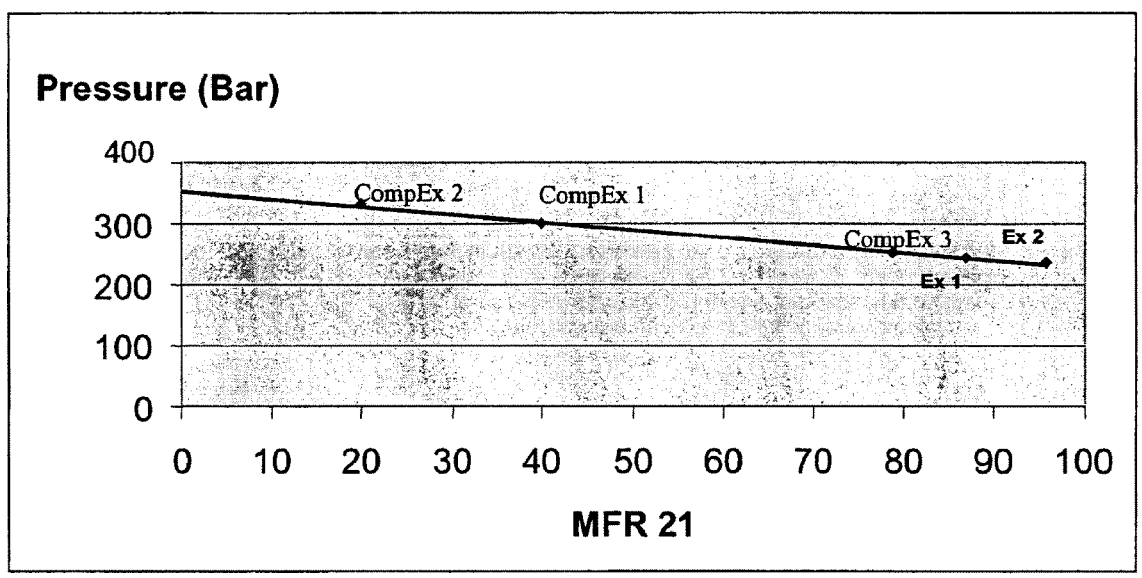

OUTER SHEATH LAYER FOR POWER OR COMMUNICATION CABLE

The present invention relates to a multimodal polyethylene composition having an improved balance of processability and mechanical properties, and to articles comprising the polyethylene composition, in particular wires/cables as well as polymeric films.

For linear low density polyethylene (LLDPE), there is a broad range of possible applications such as for wire and cable applications (in particular as a layer material) and film applications (e.g. blown films, cast films). Linear low density polyethylene has essentially a linear backbone with only short chain branches. Since it provides a good balance of processability and mechanical properties, it has become an alternative to low density polyethylene (LDPE) prepared in a high pressure process and having a high number of long chain branches.

For instance cables, such as power or communication cables, usually comprise an inner core which comprises a conducting element, such as a metal wire or a glass fibre, and one or more layers for shielding, protecting and insulating purposes. The outermost of these layers having mainly protective purpose is usually referred to as outer sheath or outer jacket.

It is known to produce outermost protective sheath layers from polymer compositions comprising mainly polyolefins, in particular polyethylenes, e.g. LDPE and LLDPE. The diverse application fields for the various kinds of cables make it necessary that the outer jacket meets a number of requirements which at least partly may be contradictory to each other.

When preparing cable layers, e.g. jacketing layers, or films by extrusion, there are several parameters which are relevant for processability. These include output rate, melt pressure, extruder motor power and surface finish. For a specific extrusion temperature, it is desired to keep melt pressure as low as possible, thereby lowering the stress exerted on the extruder equipment. Furthermore, a material of low melt pressure would enable higher output rate. From an economical point of view, it is desired to have high output rate at low extruder motor power.

Particularly in case of jacketing layers and film applications also surface finish is another relevant property of low density polyethylene materials. It was known to lower melt flow rate for improving surface smoothness. However, low MFR values normally have a detrimental effect on processability, e.g. on melt pressure and output rate.

For improving processability, it was suggested to add low density polyethylene, prepared in a high pressure process, to linear low density polyethylene. However, this might adversely affect mechanical properties including heat deformation.

It is of crucial importance that an improvement in processability is not achieved on the expense of mechanical properties. Relevant mechanical properties that could be mentioned are e.g. tensile strength and environmental stress cracking resistance. Thus, when seeking for solutions to improve processability, these properties should be improved as well or at least be maintained on a sufficiently high level.

As already discussed above, low density polyethylene as well as linear low density polyethylene are frequently used e.g. as jacketing materials for telecommunication cables. To protect the copper or optical fibre core from water intrusion, filling compounds are normally used. Thus, the polymeric jacketing material should have high compatibility with filling compounds and the jacket should still have excellent mechanical properties after exposure to filling compounds. Commonly filling compounds consist of petroleum jellies.

Another aspect that has to be taken into account for wire and cable applications as well as film applications is shrinkage behaviour. It is desired that the polymeric compositions show low shrinkage.

In EP 0907682, a bimodal polyethylene composition is disclosed which can be used as a jacketing material for cables, in particular telecommunication cables. The material disclosed in the examples have a molecular weight distribution below 15.

It is an object of the present invention to provide a polyethylene composition which meets the requirements and overcomes the problems outlined above.

In particular, it has now surprisingly been found that the present combination of low density and broad molecular weight distribution provides a polyethylene composition which has a very advantageous processability-mechanical property balance for many end applications including wire and cable and film applications.

The polyethylene composition of the invention comprises a base resin comprising at least two different ethylene polymer fractions, namely a first fraction (i) of an ethylene homo- or copolymer and a second fraction (ii) of an ethylene copolymer, wherein the base resin: (1) has a density of less than 0.940 g/cm$^3$, (2) is multimodal at least with respect to molecular weight distribution (MWD) and (3) has a broad MWD which can be defined within this invention in alternative ways.

Accordingly, the polyethylene composition of the invention is selected from the equally alternative compositions (1) to (4) as defined below. It is understood that each of the definitions of composition (1) to (4) are independent, or alternatively one of the compositions (1) to (4) may further be defined with the features of one or more of the other compositions (1) to (4).

The broad MWD, which contributes very desirably to the processability and provides feasible means for further tailoring the mechanical and/or processing properties of the polymer depending on the needs desired for the end-use application, can be measured by SEC (also known as GPC), whereby it is expressed as $M_w/M_n$, or by a rheological measurement, like Shear Thinning Index (SHI)-measurement, which is a very sensitive indicator of the MWD. Moreover, further indicators of the broad MWD of the invention are the melt flow rate (MFR) and the melt flow rate ratio (FRR) between two MFR's measured at different loadings. All these measurements are known and further defined below under "Definitions and Determination Methods".

Furthermore, by providing two fractions which differ in weight average molecular weight, a multimodal base resin is obtained.

BRIEF DESCRIPTION OF THE DRAWINGS

FIG. 1 is a graph showing the effect of the $MFR_{21.6kg/190°C.}$ on the extruder pressure.

DETAILED DESCRIPTION

Usually, a polyethylene composition comprising at least two polyethylene fractions, which have been produced under different polymerisation conditions resulting in different (weight average) molecular weights for the fractions, is referred to as "multimodal". The prefix "multi" relates to the number of different polymer fractions the composition is consisting of. Thus, for example, a multimodal composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, or when a polymer is produced in a process comprising a single stage in which two or more different catalysts are used, the polymer fractions produced in the different reactors, or by the different catalysts, respectively, will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

The first fraction (i) of the polyethylene composition of the invention is either an ethylene homo- or copolymer. Within the context of the present invention, the homopolymer is defined as having a density 0.965 g/cm³ or more.

When using a copolymer, it is preferably obtained by copolymerization of ethylene with at least one $C_3$ to $C_{20}$ alpha-olefin comonomer. Preferred comonomers are propylene, 1-butene, 1-hexene, 1-octene or mixtures thereof.

The second fraction (ii) of the present invention is an ethylene copolymer. Preferred comonomers are those already mentioned above.

Accordingly, the fractions (i) and (ii) can also be multimodal with respect to the comonomer distribution.

Preferably the comonomer content of the base resin is up to 8 mol-%, more preferably up to 5 mol-%.

Further preferably, the comonomer content of the base resin is at least 1.0 mol-%.

The low molecular weight fraction (i) preferably has a comonomer content of 0.0 to 4.0 mol-%, more preferably of 0.05 to 4.0 mol-%.

Thus as the first alternative of the polyethylene composition of the invention, a polyethylene composition (1) is provided, which comprises a base resin comprising at least (i) a first fraction which is an ethylene homo- or copolymer, and (ii) a second fraction which is an ethylene copolymer, wherein the first fraction (i) has a lower weight average molecular weight than the second fraction (ii), and the base resin has a density of less than 0.940 g/cm³ and a shear thinning index $SHI_{2.7/210}$ of at least 25.

The base resin (1) may further comprises a third fraction (iii) which is an ethylene homo- or copolymer having a weight average molecular weight which is higher than the weight average molecular weight of the first fraction (i) and is different from the weight average molecular weight of the second fraction (ii).

In a preferred embodiment, the third fraction (iii) has a higher weight average molecular weight than the second fraction (ii).

In addition to tailoring the fractions (i) and (ii), by introducing one or more further different polyethylene fraction(s) is one very feasible way of achieving the broad MWD.

As a second alternative of the polyethylene composition of the invention, a polyethylene composition (2) is provided, which comprises a base resin comprising at least (i) a first fraction which is an ethylene homo- or copolymer, (ii) a second fraction which is an ethylene copolymer, and (iii) a third fraction which is an ethylene homo- or copolymer, wherein the first fraction (i) has a lower weight average molecular weight than the second fraction (ii), the third fraction (iii) has a weight average molecular weight which is higher than the weight average molecular weight of the first fraction (i) and is different from the weight average molecular weight of the second fraction (ii), the base resin has a density of less than 0.940 g/cm³ and a flow rate ratio $FRR_{21/2}$ of at least 45, more preferably at least 65.

Equally both for the composition (1) and the composition (2) of the present invention, the base resin has preferably a density of less than 0.940 g/cm³, preferably a density of less than 0.935 g/cm³. Preferably, the base resin has a density of more than 0.910 g/cm³, more preferably more than 0.920 g/cm³, and even more preferably more than 0.922 g/cm³.

Furthermore, the base resin of the composition (1), and preferably of the composition (2), of the invention has a shear thinning index $SHI_{2.7/210}$ of at least 25. The SHI is the ratio of the viscosity of the polyethylene composition at different shear stresses. In the present invention, the shear stresses at 2.7 kPa and 210 kPa are used for calculating the $SHI_{2.7/210}$ which may serve as a measure of the broadness of the molecular weight distribution.

Preferably, equally both for the composition (1) and composition (2) the $SHI_{2.7/210}$ of the base resin is at least 30, more preferably at least 40. The upper limit is typically less than 100.

For the composition (2) and preferably for the composition (1) the base resin has a flow rate ratio $FRR_{21/2}$, which is the ratio of melt flow rate $MFR_{21.6\,kg/190°\,C.}$ to melt flow rate $MFR_{2.16\,kg/190°\,C.}$, of at least 45. Flow rate ratio can be used as an estimation of molecular weight distribution, wherein high values indicate a broad molecular weight distribution. More preferably, the base resin has a flow rate ratio $FRR_{21/2}$ of at least 65, still more preferably of more than 70, still more preferably of more than 80, still more preferably of more than 90, still more preferably of more than 95, or still more preferably of more than 100.

Preferably, the base resin has a flow rate ratio $FRR_{21/2}$ of less than 200, more preferably of less than 170, and most preferably of at most 150.

Preferred $FRR_{21/2}$ ranges for instance for wire and cable applications and film applications are e.g. from 70 to 160. For wire and cable applications the lower limit of $FRR_{21/2}$ is preferably 100.

In preferred embodiment of composition (2), and when present in composition (1), the third fraction (iii) has a weight average molecular weight of more than 90000, the upper limit being typically up to 2000000, typically up to 1000000, preferably 120000 to 600000, e.g. or more than 200000. In a preferred embodiment, the third fraction (iii) has a higher weight average molecular weight than the second fraction (ii).

For composition (2) and, when present in composition (1), the third fraction (iii) is preferably a homopolymer, whereby the term "homopolymer" is as defined above. In case the third fraction (iii) is a copolymer, it is preferably obtained by copolymerization of ethylene with at least one comonomer selected from $C_3$ to $C_{20}$ alpha-olefins. Preferred alpha-olefins are those already mentioned above.

For composition (2) and, when present in composition (1), the third fraction (iii) can be blended with the first fraction (i).

As will be explained below in greater detail, the blend can be obtained by mechanical blending or reactor blending, preferably preparing one of these fractions in a first reactor, transferring the reaction product to a second reactor and preparing the other fraction in the presence of the fraction prepared first.

The fraction (i) of the composition (1) and composition (2), has a density within the range of 0.900 to 0.970 g/cm$^3$. Preferably, the density of fraction (i) is higher than 0.920 g/cm$^3$, more preferably higher than 0.931 g/cm$^3$, even more preferably higher than 0.935 g/cm$^3$, or at least 0.940 g/cm$^3$. Preferably, the density of the fraction (i) is less than 0.955 g/cm$^3$, or 0.952 g/cm$^3$ or less.

Preferably, the blend of the first fraction (i) and the third fraction (iii) of composition (2), and the optional blend of the first fraction (i) and the third fraction (iii) of the composition (1), has a density within the range of 0.900 to 0.970 g/cm$^3$. Preferably, the density of the blend of the fractions (i) and (iii) is higher than 0.920 g/cm$^3$, more preferably higher than 0.931 g/cm$^3$, even more preferably higher than 0.935 g/cm$^3$, or at least 0.940 g/cm$^3$. Preferably, the density of the blend of fractions (i) and (iii) is less than 0.955 g/cm$^3$, or 0.952 g/cm$^3$ or less.

Equally both for composition (1) and (2), the fraction (i) or preferably, when present, the blend of the first fraction (i) and the third fraction (iii), typically has a melt flow rate $MFR_{2.16\ kg/190°\ C.}$ of more than 20 g/10 min. More preferably, $MFR_{2.16\ kg/190°\ C.}$ of the fraction (i) or of the blend of fractions (i) and (iii) is higher than 50, higher than 200, higher than 250, or even higher than 300 g/10 min. If the polyethylene composition shall be used for wire and cable applications, e.g. as a jacketing material, preferred ranges of $MFR_{2.16\ kg/190°\ C.}$ for both the fraction (i) and said blend of (i) and (iii) are 100 to 600, 200 to 500, 300 to 400, or 300 to 350 g/10 min. If the polyethylene composition shall be used for the preparation of films, preferred ranges of $MFR_{2.16\ kg/190°\ C.}$ for both the fraction (i) and said blend of (i) and (iii) are 20 to 700, 50 to 500, 250 to 350, or 300 to 350 g/10 min.

The following statements are equally applicable to the compositions (1) and (2).

Preferably, the base resin (i.e. either according to the composition (1) or (2)) has a melt flow rate $MFR_{21.6\ kg/190°\ C.}$ of more than 40 g/10 min. More preferably, the melt flow rate $MFR_{21.6\ kg/190°\ C.}$ of the base resin is higher than 60 g/10 min, higher than 85 g/10 min, higher than 90 g/10 min. Preferred $MFR_{21.6\ kg/190°\ C.}$ ranges for wire and cable applications and film applications are e.g. 90 to 115 g/10 min or 90 to 110 g/10 min. The upper limit is preferably less than 150 g/10 min.

Typically, the base resin has a molecular weight distribution $M_w/M_n$ of more than 10, preferably 15, more preferably more than 22, even more preferably more than 30. Preferably, the molecular weight distribution is less than 0.50, more preferably less than 45.

As the third alternative of the polyethylene composition of the invention, a polyethylene composition (3) is provided, which comprises a base resin comprising at least (i) a first fraction which is an ethylene homo- or copolymer, and (ii) a second fraction which is an ethylene copolymer, wherein the first fraction (i) has a lower weight average molecular weight than the second fraction (ii), the base resin has a density of less than 0.940 g/cm$^3$ and a melt flow rate $MFR_{21.6\ kg/190°\ C.}$ of more than 40 g/10 min, and the fraction (i) has a density of more than 0.931 g/cm$^3$.

Furthermore, as the fourth alternative of the polyethylene composition of the invention, a polyethylene composition (4) is provided, which comprises a base resin comprising at least (i) a first fraction which is an ethylene homo- or copolymer, and (ii) a second fraction which is an ethylene copolymer, wherein the first fraction (i) has a lower weight average molecular weight than the second fraction (ii), the base resin has a density of less than 0.940 g/cm$^3$ and the base resin has a molecular weight distribution $M_w/M_n$ of more than 15.

Just like for the compositions (1) and (2) of the present invention, the compositions (3) and (4) are preferably further defined with the following preferred subgroups and/or optional features.

Equally both for the composition (3) or the composition (4) of the present invention, the base resin has a density of less than 0.940 g/cm$^3$, preferably a density of less than 0.935 g/cm$^3$. Preferably, the base resin has a density of more than 0.910 g/cm$^3$, more preferably more than 0.920 g/cm$^3$, and even more preferably more than 0.922 g/cm$^3$.

Furthermore, the base resin of the composition (3) and the composition (4) of the invention has preferably a shear thinning index $SHI_{2.7/210}$ of at least 25. The SHI is the ratio of the viscosity of the polyethylene composition at different shear stresses. In the present invention, the shear stresses at 2.7 kPa and 210 kPa are used for calculating the $SHI_{2.7/210}$ which may serve as a measure of the broadness of the molecular weight distribution.

Preferably, both for the composition (3) and the composition (4) the $SHI_{2.7/210}$ of the base resin is at least 30, more preferably at least 40. The upper limit is typically less than 100.

Equally for the composition (3) and the composition (4) the base resin has a flow rate ratio $FRR_{21/2}$, which is the ratio of melt flow rate $MFR_{21.6\ kg/190°\ C.}$ to melt flow rate $MFR_{2.16\ kg/190°\ C.}$, of at least 45. Flow rate ratio can be used as an estimation of molecular weight distribution, wherein high values indicate a broad molecular weight distribution. More preferably, the base resin has a flow rate ratio $FRR_{21/2}$ of at least 65, still more preferably of more than 70, still more preferably of more than 80, still more preferably of more than 90, still more preferably of more than 95, or still more preferably of more than 100. Preferably, the base resin has a flow rate ratio $FRR_{21/2}$ of less than 200, more preferably less than 170, and most preferably of at most 150.

Preferred $FRR_{21/2}$ ranges for instance for wire and cable applications and film applications are e.g. from 70 to 160. For wire and cable applications the lower limit of $FRR_{21/2}$ is preferably 100.

The base resin of the composition (3) or the composition (4) may further comprise a third fraction (iii) which is an ethylene homo- or copolymer having a weight average molecular weight which is higher than the weight average molecular weight of the first fraction (i) and is different from the weight average molecular weight of the second fraction (ii).

In a preferred embodiment, the third fraction (iii) has a higher weight average molecular weight than the second fraction (ii).

In preferred embodiment of composition (3) and the composition (4), the third fraction (iii), when present, has a weight average molecular weight of more than 90000, the upper limit being up to 2000000, typically up to 1000000, preferably 120000 to 600000, e.g. or more than 200000.

Equally for composition (3) and the composition (4) the third fraction (iii), when present, is preferably a homopolymer, whereby the term "homopolymer" is as defined above. In case the third fraction (iii) is a copolymer, it is preferably obtained by copolymerization of ethylene with at least one comonomer selected from $C_3$ to $C_{20}$ alpha-olefins. Preferred alpha-olefins are those already mentioned above.

Equally for the composition (3) and the composition (4) the third fraction (iii), when present, can be blended with the first fraction (i). As will be explained below in greater detail, the blend can be obtained by mechanical blending or reactor blending, preferably preparing one of these fractions in a first reactor, transferring the reaction product to a second reactor and preparing the other fraction in the presence of the fraction prepared first.

In a preferred embodiment of the composition (3) and the composition (4), the fraction (i) or, optionally when the composition (3) or composition (4) further comprises the third fraction (iii), then preferably the blend of the first fraction (i) and the third fraction (iii), has a density within the range of 0.900 to 0.970 g/cm$^3$. Preferably, the density of fraction (i) or, optionally, of the blend of fractions (i) and (iii) is higher than 0.920 g/cm$^3$, more preferably higher than 0.931 g/cm$^3$, even more preferably higher than 0.935 g/cm$^3$, or at least 0.940 g/cm$^3$. Preferably, the density of the fraction (i) or of the optional blend of fractions (i) and (iii) is less than 0.955 g/cm$^3$, or 0.952 g/cm$^3$ or less. In case of composition (3) at least the fraction (i) and preferably the optional blend of fractions (i) and (iii) thereof has the density of more than 0.931 g/cm$^3$.

Equally for composition (3) and (4), preferably the fraction (i), or optionally the blend of the first fraction (i) and the third fraction (iii), when present, has a melt flow rate MFR$_{2.16\ kg/190^\circ\ C.}$ of more than 20 g/10 min. Even more preferably, MFR$_{2.16\ kg/190^\circ\ C.}$ of the fraction (i) or of the blend of fractions (i) and (iii) is higher than 50, higher than 200, higher than 250, or even higher than 300 g/10 min. If the polyethylene composition shall be used for wire and cable applications, e.g. as a jacketing material, preferred ranges of MFR$_{2.16\ kg/190^\circ\ C.}$ for both the fraction (i) and the blend of fractions (i) and (iii) are 100 to 600, 200 to 500, 300 to 400, or 300 to 350 g/10 min. If the polyethylene composition shall be used for the preparation of films, preferred ranges of MFR$_{2.16\ kg/190^\circ\ C.}$ both for the fraction (i) and the blend of (i) and (iii) are 20 to 700, 50 to 500, 250 to 350, or 300 to 350 g/10 min.

The following statements are equally applicable to the compositions (3) and (4).

In case of the composition (3) and preferably in case of the composition (4), the base resin has a melt flow rate MFR$_{21.6\ kg/190^\circ\ C.}$ of more than 40 g/10 min. More preferably, the melt flow rate MFR$_{21.6\ kg/190^\circ\ C.}$ of the base resin is higher than 60 g/10 min, higher than 85 g/1 min, higher than 90 g/10 min. Preferred MFR$_{21.6\ kg/190^\circ\ C.}$ ranges for wire and cable applications and film applications are e.g. 90 to 115 g/10 min or 90 to 110 g/10 min. The upper limit is preferably less than 150 g/10 min.

Typically, the base resin of the composition (3) has a molecular weight distribution $M_w/M_n$ of more than 10, preferably 15. More preferably $M_w/M_n$ of the composition (3) or (4) is more than 22, even more preferably more than 30. Preferably, the molecular weight distribution is less than 50, more preferably less than 45.

Moreover, the following statements are equally applicable to all four alternative compositions (1) to (4) of the present invention:

The base resin comprises at least fractions (i) and (ii) as defined above, preferably at least fractions (i), (ii) and (iii) as defined above. Thus, as composition (2), also the compositions (1), (3) and (4) comprise preferably a third fraction (iii) as defined above. The amount of the third fraction (iii), if present, is 10 wt % or less, preferably 0.5 to 5 wt %, based on the total weight of the base resin. In wire and cable applications, it can be present even in amounts of 2.5 to 3.3 wt % of the total amount of the base resin depending on the desired wire or cable application.

Preferably fraction (i) is a copolymer.

Preferably, the low molecular weight fraction (i) is present in an amount of 40 to 70 wt %, preferably 40 to 65 wt %, more preferably 40 to 60 wt %, based on the total weight of the base resin. Preferably, the high molecular weight fraction (ii) is present in an amount of 60 to 30 wt %, preferable 60 to 45 wt %, more preferably 60 to 40 wt %, based on the total weight of the base resin.

Preferably, the base resin as defined above has a melt flow rate MFR$_{2.16\ kg/190^\circ\ C.}$ of at least 0.05 g/10 min, more than 0.15 g/10 min, more than 0.2 g/10 min, or more than 0.5 g/10 min. As an upper limit, a MFR$_{2.16\ kg/190^\circ\ C.}$ value of 4.0 g/10 min is preferably chosen. For wire and cable applications, preferred MFR$_{2.16\ kg/190^\circ\ C.}$ ranges are e.g. 0.1 to 4.0 g/10 min, 0.3 to 2.0 g/10 min, or 0.6 to 1.5 g/10 min. For film applications, preferred MFR$_{2.16\ kg/190^\circ\ C.}$ ranges are e.g. 0.05 to 4.0 g/10 min, 0.15 to 2.0 g/10 min, or 0.2 to 0.5 g/10 min.

Preferably, the base resin as defined above has a weight average molecular weight of up to 350 000, suitably 90000 to 250000, more preferably 120000 to 200000.

In case a third fraction (iii) is present, its weight average molecular weight is preferably higher than the weight average molecular weight of the second fraction (ii). Preferably, the second fraction (ii) has a melt flow rate MFR$_{2.16\ kg/190^\circ\ C.}$ between 0.01 to 1 g/10 min.

Preferably, the second fraction (ii) has a density between 0.880 to 0.930 g/cm$^3$. Even more preferably, the density of the second fraction is within the range of 0.890 to 0.910 g/cm$^3$.

The composition of the invention covers the base resin as such or any blends with further components including other polymer components for forming a polymer blend as well as additives. Thus e.g. usual additives for utilization with polyolefins, such as pigments (for example carbon black), stabilizers (antioxidant agents), antacids and/or anti-UVs, antistatic agents, polymers as carriers for additives or as modification of the performance of e.g. extrudability and utilization agents (such as processing aid agents) may be present in the polyethylene composition. Preferably, the amount of these additives is 10 wt % or below, further preferred 8 wt % or below, of the total composition. The additives can be added as such or in master batches as known in the field.

In one advantageous embodiment, the present composition comprising the base resin has the given SHI range or any of the preferred SHI ranges as defined above for the base resin.

In another advantageous embodiment, the definitions given above for the base resin (including any optional features and preferable embodiments of the base resin) apply also for the polyethylene composition, preferably for any of the compositions (1) to (4), of the invention comprising the base resin.

The present invention also provides a process for preparing the polyethylene compositions as discussed above, comprising the following steps:

(a) polymerizing ethylene, optionally with at least one alpha-olefin comonomer, to obtain a first polyethylene homo- or copolymer fraction (i), and (b) polymerizing ethylene with at least one alpha-olefin comonomer to obtain a second polyethylene copolymer fraction (ii), wherein fractions (i) and (ii) are blended to obtain the base resin.

The process can be used to prepare any of the four alternatives of the present invention.

Blending of the fractions (i) and (ii) can be effected by mechanical blending or reactor blending in a multistage process, preferably preparing one of these fractions in a first reactor, transferring the reaction product to a second reactor and preparing the other fraction in the presence of the fraction prepared first.

Preferably, the base resin is produced in a multistage process wherein the process steps can be carried out in the sequence (a)→(b) or (b)→(a).

A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst.

Accordingly, it is preferred that fraction (i) and (ii) of the polyethylene composition are produced in different stages of a multistage process.

Preferably, the multistage process comprises at least one gas phase stage in which, preferably, fraction (ii) is produced. Further preferred, fraction (ii) is produced in a subsequent stage in the presence of fraction (i) which has been produced in a previous stage.

For example, in the production of, say, a bimodal polyethylene, a first ethylene polymer fraction is produced in a first reactor under certain conditions with respect to hydrogen-gas concentration, temperature, pressure, and so forth. After the polymerisation in the first reactor, the polymer fraction including the catalyst is separated from the reaction mixture and transferred to a second reactor, where further polymerisation takes place under other conditions.

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene composition according to the invention.

Preferably, the main polymerisation stages of the multistage process are such as described in EP 517 868, i.e. the production of fractions (i) and (ii) is carried out as a combination of slurry polymerisation for fraction (i) and gas-phase polymerisation for fraction (ii). The slurry polymerisation is preferably performed in a so-called loop reactor. Further preferred, the slurry polymerisation stage precedes the gas phase stage.

The resulting end product consists of an intimate mixture of the polymers from the two reactors, the different molecular-weight-distribution curves of these polymers together forming a molecular-weight-distribution curve having a broad maximum or at least two maxima, i.e. the end product is at least a bimodal polymer mixture.

In the preferred embodiment of the polymerisation in a loop reactor followed by a gas-phase reactor, the polymerisation temperature in the loop reactor preferably is 40 to 110° C., preferably between 70 to 110° C. and the temperature in the gas-phase reactor is typically 50 to 130° C., preferably 60 to 115° C.

A chain-transfer agent, preferably hydrogen, is added as required to the reactors, and preferably 100 to 800 moles of $H_2$/kmoles of ethylene are added to the reactor, when the LMW fraction is produced in this reactor, and 0 to 50 moles of $H_2$/kmoles of ethylene are added to the gas phase reactor when this reactor is producing the HMW fraction.

Preferably, the comonomer is added to the low molecular weight fraction (i) mole ratio of alfa-olefin to ethylene being in the range of 0.1:1 to 1:1. More preferred is 0.3:1 to 0.8:1. The high molecular weight fraction (ii) is an ethylene copolymer. Preferred comonomers are those already mentioned above for the first fraction. Preferably, mole ratio of alfa olefin to ethylene is in the range of 0.1:1 to 1:1. More preferred is 0.3:1 to 0.8:1.

As polymerisation catalysts, in principle any catalyst which is suitable for producing the present base resin of the invention can be used, including Ziegler-Natta, single site (including metallocene and non metallocene catalysts) or chromium catalysts, preferably Ziegler-Natta or metallocene catalysts.

The base resin of the polyethylene composition according to the invention preferably is produced using a Ziegler-Natta catalyst comprising a group 4 metal compound (of Periodic Table, IUPAC nomenclature of inorganic chemistry, 1989), preferably a Ti-compound, and a halogen-containing magnesium compound.

In one preferable embodiment, the catalyst is a non-silica supported catalyst, i.e. the active components are not supported to an external silica support. Preferably, the support material of the catalyst is a Mg-based support material.

Examples of such preferred Ziegler-Natta catalysts are described in EP 0 810 235. The content of this document in its entirety is incorporated herein by reference, in particular concerning the general and all preferred embodiments of the catalysts described therein as well as the methods for the production of the catalysts.

In another embodiment, the used Ziegler-Natta catalyst is a silica supported catalyst e.g. described in EP 0688794 A1. The content of this document in its entirety is incorporated herein by reference, in particular concerning the general and all preferred embodiments of the catalysts described therein as well as the methods for the production of the catalysts.

Preferably, the multistage process of the present invention further comprises a polymerisation step (c), in any order, for the preparation of the ethylene homo- or copolymer fraction (iii). Preferably step (c) is carried out first, preferably in the presence of a Ziegler-Natta catalyst, followed by reaction steps (a) and (b), and the split between step (c) and reaction steps (a) and (b) is from 0.1:99.9 to 10:90. Alternatively, as mentioned above, mechanical blending can also be used for blending the fraction (iii).

More preferably, the split between polymerization step (c) and reaction steps (a) and (b) is from 0.5:99.5 to 7:93.

The polymer is preferably an ethylene homopolymer, preferably a high density polyethylene (HDPE). However, it is also possible to use an ethylene copolymer, preferably obtained by copolymerization of ethylene with at least one $C_3$ to $C_{20}$ alpha-olefin comonomer. Preferred $C_3$ to $C_{20}$ alpha-olefin comonomers are those already mentioned above with regard to the first and second base resin fraction.

At the polymerisation step (c), preferably all of the catalyst is charged into a loop reactor and the polymerisation is performed as a slurry polymerisation.

For the polymerization step (c), the ratio of $H_2$ feed (in g/h) to $C_2$ feed (in g/h) is preferably in the range of 0 to 0.005.

For the process comprising a prepolymerization step (c), it is again preferred to use the Ziegler-Natta catalysts described above.

In case of a multimodal process, the product obtained in the last step, e.g. step (b), is a mixture of the products obtained from the previous steps. The above given definitions for the fractions, e.g. for fraction (ii) can in that case be calculated using the calculation methods described in the literature.

The present invention also provides an article comprising the polyethylene composition as described above. Preferably, the article is a wire or cable comprising at least one layer which comprises the polyethylene composition of the invention. The layer is preferably a jacketing layer. According to another preferred embodiment, the article is a film comprising at least one layer which comprises the polyethylene composition of the invention.

The composition for the outer sheath layer of the cable preferably is produced in a process comprising a compounding step, wherein the composition of the base resin, i.e. the blend, which is typically obtained as a base resin powder from the reactor, is extruded in an extruder and then pelletised to polymer pellets in a manner known in the art, and finally further processed, e.g. extrudered in a known manner to form a wire or cable layer.

Optionally, additives or other polymer components can be added to the composition during the compounding step, e.g. during the extrusion step for forming the pellets and/or during the extrusion step for forming a layer, such as a cable or film layer.

The cables of the invention in addition to the outermost sheath layer comprise at least one or more power or information conducting elements.

Preferably, the polyethylene composition is used as the cable sheathing composition for producing outer sheath layers for cables, including power cables as well as communication cables. Amongst power cables, mention may be made of high-voltage cables, medium voltage cables, and low voltage cables. Amongst communication cables, mention may be made of pair cables, coaxial cables and optical cables.

DEFINITIONS AND DETERMINATION METHODS

The terms and determination methods for the measured properties used for defining the invention apply generally both for the description part above and for the examples and claims below, unless otherwise stated:

a) Molecular Weight/Molecular Weight Distribution

The molecular weight averages and molecular weight distribution were measured on a Waters Alliance GPCV2000 SEC instrument with on-line viscometer at 140 degrees Celsius using 1,2,4-trichlorobenzene (TCB) stabilized with 2,6-di-tert-butyl-4-methylphenol (BHT) as an eluent. A set of two mixed beds and one $10^7$ Å TSK-Gel columns from TosoHaas was used and the system was calibrated with NMWD polystyrene standards (from Polymer laboratories). The analyses were carried out following the principles of standard test methods ISO 16014-2:2003 and ISO 16014-4:2003.

b) Density

Density is measured according to ISO 1183D.

c) Melt Flow Rate/Flow Rate Ratio

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$), 5 kg ($MFR_5$) or 21.6 kg ($MFR_{21}$).

The quantity FRR (flow rate ratio) is an indication of molecular weight distribution and denotes the ratio of flow rates at different loadings. Thus, $FRR_{21/2}$ denotes the value of $MFR_{21}/MFR_2$.

d) Rheological Parameters

Rheological parameters such as Shear Thinning Index SHI and Viscosity are determined by using a rheometer, preferably a Rheometrics Phisica MCR 300 Rheometer, on compression moulded samples under nitrogen atmosphere at 190° C. using 25 mm diameter plates and plate and plate geometry with a 1.2 mm gap. The oscillatory shear experiments were done within the linear viscosity range of strain at frequencies from 0.05 to 300 rad/s (ISO 6721-1). Five measurement points per decade are made.

The values of storage modulus (G'), loss modulus (G") complex modulus (G*) and complex viscosity ($\eta^*$) were obtained as a function of frequency ($\omega$). $\eta 100$ is used as abbreviation for the complex viscosity at the frequency of 100 rad/s.

The definition and measurement conditions are also described in detail on page 8 line 29 to page 11, line 25 of WO 00/22040.

Shear thinning index (SHI), which is correlating with MWD and is independent of Mw, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.)

For example, SHI (1/100) value is obtained by calculating the complex viscosities eta(1) and eta(100) at a constant shear stress of 1 kPa and 100 kPa, respectively. The shear thinning index SHI(1/100) is defined as the ratio of the two viscosities eta(1) and eta(100). Correspondingly, the SHI(2.7/210) is defined as the ratio of the two viscosities eta(2.7) and eta(210).

e) Environmental Stress Cracking Resistance (ESCR)

ESCR was evaluated according to CTL: ISO 6259, with a notch applied according to ASTM F1473. using CTL with different constant stress of 2, 3 and 4 MPa. A 10% Igepal solution was used as medium.

f) Cable Samples for the Evaluation are Extruded as Follows.

| | |
|---|---|
| Conductor | 3.0 mm Solid Al conductor |
| Wall thickness | 1.0 mm |
| Temperature, die | +210° C. |
| Distance between die and waterbath | 35 cm |
| Temperature, water bath | +23° C. |
| Line velocity | 75 m/min |
| Die type | Semi-tube |
| Nipple | 3.65 mm |
| Die | 5.9 mm |
| Screw design | Elise | g) Shrinkage

The shrinkage in percent is measured after 24 h in constant temperature (+23° C.) as well as after 24 h at a temperature of +100° C. Cable samples measuring approximately 40 cm are measured. Conveniently, the samples are so marked that the measurement after the conditioning can be carried out at the same point on the cable sample.

Should the sample be found to shrink during measurement, marks of about 40 cm first have to be made. Then the length is cut and re-measured. Double samples are taken of each cable that is to be analysed. The samples are placed in the room with constant temperature for 24 h, whereupon they are measured, and shrinkage values in percent are calculated. All the samples are then placed on a talcum bed at 100° C. for 24 h. The samples are measured, and the total shrinkage in percent is calculated on the basis of the initial length.

h) Filler Absorption

Filler absorption was measured on plaques, quenched in cool water according to the method as described below under "Compatibility with filling compounds".

i) Mechanical Properties

Elongation at break and tensile strength at break were measured according to 22542/ISO 527-2/1A,B, either on plaques or on cables having a jacket of 1 mm in thickness applied on a 3 mm in diameter aluminium conductor.

j) Heat Deformation

This was tested according to EN 60811-3-1:1995. This was tested on cables 3 mm core and 1 mm jacketing layer extruded directly on the conductor. This property is directly proportional to the density. In this test we have used cool waterbath during extrusion, therefore reproducing the worst case. When the molten plastics meet cold water the density is lower than if the crystallization takes place during slow cooling, see table for results. The indention at 115° C. after 4 h is recorded and reported as how many % the egg is penetrating the sample thickness.

k) Melting temperature $T_m$, crystallization temperature $T_{cr}$, and the degree of crystallinity: measured with Mettler TA820 differential scanning calorimetry (DSC) on 3±0.5 mg samples. Both crystallization and melting curves were obtained during 10° C./min cooling and heating scans between −10-200° C. Melting and crystallization temperatures were taken as the peaks of endotherms and exotherms. The degree of crystallinity was calculated by comparison with heat of fusion of a perfectly crystalline polyethylene, i.e. 290 J/g.

l) Comonomer content (wt %) can be determined in a known manner based on Fourier transform infrared spectroscopy (FTIR) determination calibrated with $C^{13}$-NMR.

Tested Compositions

The following polymerisation procedure and catalyst were used in all the examples of the invention unless otherwise stated.

All the examples were produced in pilot plant multistage reaction comprising an optional first stage in slurry in a 50 dm³ loop reactor as the polymerization step (c) for producing the third fraction (iii), then followed by transferring the slurry to a 500 dm³ loop reactor wherein polymerisation step (a) was effected in slurry to produce the first fraction (i) and a polymerization step (b) in a gas phase reactor in the presence of the product from the second loop reactor containing optionally the product from step (c) to produce the comonomer containing the second fraction (ii). The reaction conditions are given in the tables below.

EXAMPLES 1-5

Two polyethylene compositions according to the present invention (Ex1 and Ex2) and three comparative polyethylene compositions have been prepared (CompEx 1-3) as described. The polymerisation steps (a) and (b) where effected to obtain bimodal examples, i.e. the step (c) was not included in examples 1-5.

The catalyst used in Ex 1-2 and CompEx 1-2 was a Ziegler-Natta type catalyst which corresponds to the one used in EP 6887794, Example 3. Triethylaluminium (TEA) was used as the cocatalyst.

All compositions are bimodal. Further information about each composition is given below:

TABLE 1

Properties of Ex 1-2 and CompEx 1-2

|  | Ex. 1 | Ex. 2 | CompEx 1 | CompEx 2 |
|---|---|---|---|---|
| The final composition with additives given below | | | | |
| Density (kg/cm³) | 921.8 | 924.4 | 923 | 923 |
| MFR2 (g/10 min) | 0.87 | 0.81 | 0.4 | 0.2 |
| MFR21 (g/10 min) | 87 | 96 | 40 | 22 |
| FRR21/2 | 100 | 118 | 100 | 110 |
| The step (a): Loop Conditions and the product of step (a) | | | | |
| Temperature (° C.) | 85 | 85 | | |
| Pressure (bar) | 60 | 60 | | |
| H2/C2 ratio (mol/kmol) | 282 | 275 | 330 | 350 |
| C4/C2 ratio (mol/kmol) | 147 | 142 | 670 | 630 |
| MFR2 (g/10 min) | 520 | 520 | 300 | 300 |
| Density (kg/cm³) | 952 | 951 | 951 | 945 |
| Split | 50 | 54 | 43 | 42 |
| The step (b): Gasphase Conditions and product obtained after step (b) | | | | |
| Temperature (° C.) | 80 | 80 | | |
| Pressure (bar) | 20 | 20 | | |
| H2/C2 ratio (mol/kmol) | 8 | 8 | 10 | 3 |
| C4/C2 ratio (mol/kmol) | 747 | 695 | 650 | 600 |
| MFR2 (g/10 min) | 0.85 | 0.7-1 | | |
| Density (kg/cm³) | 892 | 893 | 901 | 907 |
| Split | 50 | 46 | 57 | 58 |
| SHI (2.7/210) | 52 | 62 | | |

As additives, 2400 ppm Irganox B225 and 1500 ppm calcium stearate was used.

TABLE 2

Molecular weight and molecular weight distribution of Ex 1-2

|  | Ex 1 | Ex 2 | Comp Ex 1 |
|---|---|---|---|
| Mw | 149000 | 139000 | 170000 |
| Mn | 9040 | 8070 | 10000 |
| Mz | 845000 | 796000 | 900000 |
| MWD | 16.5 | 17.3 | 17 |

In Ex 1 and 2, the melt flow rate $MFR_{21.6\ kg/190°\ C.}$ is significantly higher than in the comparative examples. Furthermore, as indicated by FRR21/2 and MWD values, the inventive examples have a broad molecular weight distribution.

CompEx 3 is a linear low density polyethylene (LLDPE) including 15 wt % low density polyethylene to improve processability. Properties of the blend are given in Table 3:

TABLE 3

Properties of CompEx 3

|  | Comp. Ex. 3 |
|---|---|
| Density (g/cm³) | 0.920 |
| MFR2 (g/10 min) | 0.8 |
| MFR21 (g/10 min) | 79 |
| FRR$_{21/2}$ | 65 |
| SHI (2.7/210) | 50 |

In the following, relevant processing properties and mechanical properties of these compositions will be provided and discussed.

Processability

As already discussed above, the processability of a jacketing material includes several parameters e.g. surface finish, output, melt pressure, and extruder motor power. It is important that the processing window is wide since there are many different applications for a jacketing material.

To evaluate the processability, the compositions were extruded at a cable line. 1 mm thick jacket were applied on a 3 mm in diameter aluminum conductor. To stress the material in terms of shrinkage performance the temperature setting was not optimal. The conductor was not preheated, the melt temperature was 210° C. and the cooling bath temperature was 23° C. The line speed was 75 m/min.

Surface Finish

Surface finish was evaluated by visual and hands on inspection.

Previous experience is that the lower the MFR the better is the surface finish. However, all cables produced showed a very smooth surface which is quite surprising considering the high MFR21 values chosen for Ex 1-2.

Output and Melt Pressure

In Table 4, data from the cable line extrusion test are shown.

TABLE 4

Cable line extrusion test

|  | Ex 1 | Ex 2 | Comp Ex 2 | Comp Ex 1 | Comp Ex 3 |
|---|---|---|---|---|---|
| Filter pressure (Bar) | 243 | 235 | 332 | 300 | 255 |
| RPM | 61 | 61 | 65 | 59 | 58 |
| Extruder power (amps) | 55 | 55 | 67 | 65 | 62 |

The results of Table 4 clearly indicate that the inventive compositions can be extruded at lower pressure and extruder power.

The effect of $MFR_{21.6\,kg/190°\,C.}$ on extruder pressure is also shown in FIG. 1. Due to the lower MFR21, CompEx 1-2 need a much higher extruder pressure to have the same output. By blending LDPE and LLDPE (i.e. CompEx 3), it is possible to have an extruder pressure comparable the one of Ex 1-2. However, adding LDPE adversely affects mechanical properties, heat deformation and shrinkage behaviour, as will be shown below.

Environmental Stress Cracking Resistance (ESCR)

The environmental stress cracking was evaluated using CTL with different constant stress. A 10% igepal solution was used as medium. The results are shown in table 5.

TABLE 5

ESCR results

|  | Ex 1 | Ex 2 | CompEx 1 | CompEx 2 | CompEx 3 |
|---|---|---|---|---|---|
| CTL 2 MPa (h) |  |  |  |  |  |
| CTL 3 MPa (h) | >3500 | >3500 | >3500 | >3500 | 55.25 |
| CTL 4 MPa (h) | >3500 | >3500 | >3500 | >3500 | 30.35 |
| ESCR bell test (F0h) | >2000 | >2000 | >2000 |  | >2000 |

Mechanical Properties

Elongation at break and tensile strength are summarized in Table 6. The results demonstrate that the inventive examples have good mechanical properties. In other words, processability has been improved while keeping mechanical properties on a high level.

TABLE 6

Data about mechanical properties

|  | Ex 1 | Ex 2 | CompEx 2 | CompEx 1 | CompEx 3 |
|---|---|---|---|---|---|
| Elongation at break (%) | 711 | 703 | 661 | 804 | 829 |
| Tensile strength at break (MPa) | 26.1 | 25.8 | 30.5 | 31.8 | 22.0 |

Shrinkage

Shrinkage values are listed in Table 7.

TABLE 7

Shrinkage behaviour

|  | Ex 1 | Ex 2 | CompEx 2 | CompEx 1 | CompEx 3 |
|---|---|---|---|---|---|
| Shrinkage 24 h 23° C. (%) | 0.04 | 0.04 | 0.05 | 0.00 | 0.24 |
| Shrinkage 24 h 100° C. (%) | 0.08 | 0.13 | 0.19 | 0.18 | 0.92 |

The data of Table 7 indicate that the compositions of the present invention show low shrinkage. In particular, it is evident that the improvement in processability of CompEx 3 (e.g. low extrusion pressure) adversely affects shrinkage behaviour.

Film Testing

Films were blown on a small-scale film line (Ankutek, build 1997) at 90 rpm with die gap 0.8 mm under std. LLDPE conditions, the die diameter was 50 mm, the Frost Line Height 8 times the die diameter, the screw speed was 90 rpm and the blow up ratio (BUR) was 1:3. The produced films had a thickness of 40 micron.

TABLE

Film line melt pressure of Ex. 1, Ex. 2 and CompEx. 2.

| Resin | Ex. 1 | Ex. 2 | CompEx 2. |
|---|---|---|---|
| Melt pressure [bar] | 227 | 208 | 285 |
| Split [%] | 50 | 54 | 57 |
| MFR5 [g/10 min] | 3.6 | ~3.7 | 2.0 |
| Dart Drop [g] | 250 | 210 | 250 |
| Elmendorf Tear Resistance [MPa] | 3.5 | 2.7 | 3.0 |

Tear Resistance (Determined as Elmendorf Tear (N))

The tear strength is measured using the ISO 6383/2 method. The force required to propagate tearing across a film specimen is measured using a pendulum device. The pendulum swings under gravity through an arc, tearing the specimen from pre-cut slit. The specimen is fixed on one side by the pendulum and on the other side by a stationary clamp. The tear strength is the force required to tear the specimen.

Dart Drop

Dart drop is measured using ISO 7765-1 method. A dart with a 38 mm diameter hemispherical head is dropped from a height of 0.66 m onto a film clamped over a hole. If the specimen fails the weight of the dart is reduced and if it does not fail the weight is increased. At least 20 specimen need to be tested. A weight resulting failure of 50% of the specimen is calculated.

Compatibility with Filling Compounds

The main application for LD and LLD jackets is in telecommunication cables. In many telecables, copper or fiber optical, filling compounds are used to protect them from water intrusion. A petroleum jelly based, Insojell 3332, is commonly used in copper cables. This filling compound is normally the filling compound that gives the highest absorption.

Two tests are performed, weight increase and the influence on the mechanical properties.

Dumbbells 2 mm thick from pressed plaques were put in Insojell 3332 for 7 days. The samples were put on aluminum rods to enable free access for the petroleum jelly from all sides. The ageing was done at 60° C. For the results see table 9.

TABLE 9

Influence of petroleum jelly

|  | Ex 1 | Ex 2 | CompEx 2 | CompEx 1 | CompEx 3 |
|---|---|---|---|---|---|
| Weight increase (%) | 14.5 | 12.2 | 10.5 | 9.0 | 7.9 |
| Tensile strength at break (MPa) | 20.7 | 21.4 | 25.4 | 25.7 | 16.4 |
| Change in tensile strength (%) | −8.0 | 5 | −23.3 | −20.5 | −11.4 |
| Elongation at break (%) | 717 | 778 | 639 | 736 | 756 |
| Change in elongation (%) | −19.2 | −14.8 | −22.0 | −13.9 | −10.7 |

EXAMPLES 6-13

In these examples, three polyethylene compositions according to the present invention (Ex 3-5) and five reference materials (CompEx 4-8) were prepared in a pilot plant as described above. In case of examples 3-5 a polymerization step (c) in a first loop reactor was included to prepare the third fraction (iii). As a catalyst for the examples 3-5 a commercial Lynx 200™ catalyst as manufactured and supplied by Engelhard Corporation, Pasadena, USA.

Thus, the final composition of Ex. 3-5 included three polymer fractions (i), (ii) and (iii).

For the CompEx 4-8 the same catalyst was used as for examples 1-5. For preparing CompEx 4-8 no polymerization step (c) was included. Thus, CompEx 4-8 was bimodal.

CompEx 4 was the same as comparative example 5 but compounded with 15% LDPE. CompEx 5 corresponds to CompEx 1. CompEx 6 is as CompEx 5 but compounded with carbon black. All CompEx 5, 7 and 8 were natural, i.e. no carbon black or LDPE was added. Further information about these compositions is provided in Table 10.

TABLE 10

Process conditions and properties for Ex 3-5

| sample | | Ex 3 | Ex 4 | Ex 5 |
|---|---|---|---|---|
| Polymerisation step (c) Conditions and Product obtained after step (c) | | | | |
| temperature | ° C. | 60 | 60 | 60 |
| pressure | bar | 61 | 60 | 61 |
| catalyst feed | g/h | 1.4 | 1.4 | 2.3 |
| cocatalyst feed | g/h | 5.0 | 5.0 | 5.0 |
| $C_2$ feed | kg/h | 1.9 | 1.7 | 2.0 |
| $H_2$ feed | g/h |  |  | 0.6 |
| $C_3$ feed | kg/h | 36.8 | 35.7 | 38.7 |
| split | wt-% | 2.7 | 2.5 | 3.0 |

TABLE 10-continued

Process conditions and properties for Ex 3-5

| sample | | Ex 3 | Ex 4 | Ex 5 |
|---|---|---|---|---|
| Polymerisation step (a) Conditions and Product obtained after step (a) | | | | |
| temperature | ° C. | 80 | 80 | 80 |
| pressure | bar | 56 | 56 | 56 |
| $C_2$ concentration | mol % | 3.9 | 4.5 | 4.3 |
| $H_2/C_2$ ratio | mol/kmol | 399 | 360 | 390 |
| $C_4/C_2$ ratio | mol/kmol | 469 | 388 | 421 |
| production rate | kg/h | 32 | 31 | 30 |
| split | wt-% | 50.9 | 51.6 | 51.5 |
| MFR2 | g/(10 min) | 350 | 300 | 350 |
| density | kg/cum | 944 | 947 | 946 |
| comonomer | | 1-butene | 1-butene | 1-butene |
| Polymerisation step (b) Conditions and product (b) obtained after step (b) | | | | |
| temperature | ° C. | 80 | 80 | 80 |
| pressure | bar | 20 | 20 | 20 |
| $C_2$ concentration | mol % | 11 | 12 | 11 |
| $H_2/C_2$ ratio | mol/kmol | 34 | 29 | 31 |
| $C_4/C_2$ ratio | mol/kmol | 403 | 455 | 450 |
| $C_6/C_2$ ratio | mol/kmol | | | |
| $C_4/C_6$ feed ratio | g/kg | 270 | 324 | 321 |
| production rate | kg/h | 30.5 | 29.3 | 28.8 |
| split | wt-% | 49.1 | 48.4 | 48.5 |
| MFR2 | g/(10 min) | 0.8 | 0.9 | 1.0 |
| MFR21 | g/(10 min) | 87 | 94 | 106 |
| FRR21/2 | — | 104 | 106 | 106 |
| density | kg/cum | 926 | 927 | 925 |
| calculated density (HMW fraction) | kg/cum | 907 | 906 | 903 |
| comonomer | | 1-butene | 1-butene | 1-butene |
| The final compound after compounding | | | | |
| MFR2 | g/(10 min) | 0.8 | 0.9 | 1.0 |
| MFR5 | g/(10 min) | 3.40 | 3.90 | 4.50 |
| MFR21 | g/(10 min) | 90.0 | 102.0 | 111.0 |
| FRR21/2 | — | 114 | 115 | 111 |
| MWD | — | 31.6 | 32.0 | 32.3 |
| density | kg/cum | 926.3 | 928.3 | 926.8 |
| irganox B225 | ppm | 2640 | 2650 | 2690 |
| Ca-stearate | ppm | 1580 | 1580 | 1590 |

TABLE 11

Properties of reference materials

|  | CompEx 4 | CompEx 5 | CompEx 6 | CompEx 7 | CompEx 8 |
|---|---|---|---|---|---|
| Final composition | natural | natural | +carbon black 2.5 wt % | natural | natural |
| Density (kg/cm³) | 925 | 923 | 931* | 920 | 921.5 |
| MFR2 (g/10 min) | 0.4 | 0.4 | 0.7 | 0.8 | 0.7 |
| MFR21 (g/10 min) |  | 40 | 79 | 79 | 46 |
| FRR21/2 |  | 100 | 65 | 65 | 68 |
| Step (a): loop | | | | | |
| Temperature |  |  |  |  | 85 |
| Pressure |  |  |  |  | 57 |
| H2/C2 ratio |  | 330 |  |  | 202 |
| C4/C2 ratio |  | 670 |  |  | 609 |
| MFR2 (g/10 min) |  | 300 |  |  | 290 |
| Density (kg/cm³) |  | 951 |  |  | 950 |
| Split |  | 43 |  |  | 43.5 |
| Step (b): | | | | | |
| Temperature |  |  |  |  | 80 |
| Pressure |  |  |  |  | 20 |

TABLE 11-continued

Properties of reference materials

| | CompEx 4 | CompEx 5 | CompEx 6 | CompEx 7 | CompEx 8 |
|---|---|---|---|---|---|
| H2/C2 ratio | | 10 | | | 4.4 |
| C4/C2 ratio | | 650 | | | 619 |
| MFR2 (g/10 min) | | | | | 0.7 |
| Density (kg/cm³) | | 901 | | | 897 |
| Split | | 57 | | | 56.5 |

In Table 12, molecular weight and molecular weight distribution of Ex 3-5 and CompEx 5 and 8 are summarized. From Table 12, it is evident that the presence of a third fraction (iii) in the inventive compositions significantly broadens the molecular weight distribution, if compared to the reference materials.

TABLE 12

Molecular weight and molecular weight distribution

| | Ex 3 | Ex 4 | Ex 5 | CompEx 8 | CompEx 5 |
|---|---|---|---|---|---|
| Mw | 136000 | 143000 | 136000 | 143000 | 185000 |
| Mn | 4330 | 4480 | 4220 | 10100 | 15000 |
| Mz | 808000 | 940000 | 901000 | 612000 | |
| MWD | 31.6 | 32 | 32.3 | 14.2 | 12.3 |

In Table 13, the shear thinning index SHI(2.7/210) of Ex 3-5 and CompEx 8 is given.

TABLE 13

Shear thinning index

| Product | SHI (2.7/210) |
|---|---|
| Ex 3 | 65 |
| Ex 4 | 60 |
| Ex 5 | 58 |
| CompEx 4 | 41 |
| CompEx 5 | 35 |
| CompEx 6 | 50 |
| CompEx 8 | 25 |

As shown in Table 13, the inventive compositions have high shear thinning index, significantly exceeding the value of the reference material. As already discussed above, high SHI values indicate a broad molecular weight distribution.

The compositions have been subjected to tests for processability and mechanical properties. The results are shown and discussed below.

Surface Finish

Surface finish was evaluated by visual and hands on inspection. Two different phenomena were observed, first the surface finish as such but also the shape of the insulation. At higher line speed a wave shape occurred at some of the materials. The former are due to the melt strength and the second is more due to extruder pumping and could possibly be corrected by increased melt temperature. However it indicates a more narrow processing window. Previous experience is that the lower the MFR the better is the surface finish. Although the inventive compositions have much higher MFR, they provide excellent results at these line speeds.

TABLE 14

Evaluation of surface properties

| | Line speed | Ex 3 | Ex 4 | Ex. 5 A2047 | CompEx 8 | CompEx 6 | CompEx 5 | CompEx 4 |
|---|---|---|---|---|---|---|---|---|
| Surface smoothness 0-4 (4 is best) | 15 | 3 | 3 | 4 | 4 | 3 | 3 | 4 |
| | 35 | 4 | 4 | 4 | 4 | 4 | 4 | 4 |
| | 70 | 4 | 4 | 4 | 4 | 4 | 4 | 4 |
| | 140 | 4 | 4 | 4 | 4 | 4 | 4 | 4 |
| Waviness 1-4 (4 is best) | 15 | 4 | 4 | 4 | 4 | 4 | 4 | 4 |
| | 35 | 4 | 4 | 4 | 4 | 4 | 4 | 4 |
| | 70 | 4 | 4 | 4 | 4 | 4 | 4 | 4 |
| | 140 | 4 | 4 | 4 | 3 | 3 | 2 | 2 |
| Over all performance compared to CompEx 6 | | =/+ | =/+ | +/+ | +/= | | =/− | +/− |

Melt Pressure

Just like Ex 1-2, the inventive examples 3-5 have low melt pressure at a specific line speed. With CompEx 6-7 (i.e. blends of LLDPE and LDPE), a low melt tension can be obtained as well. However, as will be shown below, in these materials low-melt tension adversely affects tensile strength, heat deformation and shrinkage behaviour.

In CompEx 4, 5 and 8, melt tension is significantly higher.

Melt tension as a function of line speed is shown in FIG. 2.

Mechanical Properties

Mechanical properties are summarized in Tables 15 and 16.

TABLE 15

Mechanical properties measured on plaques

| Plaques | Ex 3 | Ex 4 | Ex 5 | CompEx 8 | CompEx 4 | CompEx 5 | CompEx 6 |
|---|---|---|---|---|---|---|---|
| Elongation at break (%) | 904 | 907 | 937 | 837 | 808 | 824.9 | 810 |
| Tensile strength at break (MPa) | 26.3 | 28.7 | 28.5 | 33.1 | 31.7 | 32.5 | 19.5 |

The data of Table 15 show that the inventive examples have good mechanical properties. In particular, when comparing Ex 3-5 with CompEx 6 it is evident that only the inventive examples have an improved balance between processability (e.g. low melt pressure) and mechanical properties.

TABLE 16

Mechanical properties measured on cables

| Cables | Ex 3 | Ex 4 | Ex 5 | CompEx 8 | CompEx 4 | CompEx 5 | CompEx 6 |
|---|---|---|---|---|---|---|---|
| Elongation at break (%) | 597 | 631 | 620 | 576 | 500 | 551 | 527 |
| Tensile strength at break (MPa) | 17.1 | 17.6 | 17.3 | 18.8 | 17.9 | 17 | 17.6 |

Shrinkage 24 h shrinkage was measured at 23° C. and 100° C. The results are summarized in Table 17. The inventive examples show good shrinkage performance.

TABLE 17

Shrinkage behaviour

| | Ex 3 | Ex 4 | Ex 5 | CompEx 4 | CompEx 5 | CompEx 6 | CompEx 8 |
|---|---|---|---|---|---|---|---|
| Shrinkage 24 h 23° C. (%) | 0.15 | 0.0 | 0.0 | 0.0 | 0.00 | 0.0 | 0.0 |
| Shrinkage 24 h 100° C. (%) | 0.34 | 0.08 | 0.15 | 0.45 | 0.07 | 0.4 | 0.01 |

Compatibility with Filling Compounds

Two compatibility tests were performed: weight increase and the influence on the mechanical properties.

Dumbbells 2 mm thick from pressed plaques were put in Insojell 3332 for 7 days. The samples were put on aluminum rods to enable free access for the petroleum jelly from all sides. The ageing was done at 70° C. The results are shown in Table 18.

TABLE 18

Results from compatibility tests

| Jelly absorption | Ex 3 | Ex 4 | Ex 5 | CompEx 8 | Comp Ex 4 | CompEx 5 | CompEx 6 |
|---|---|---|---|---|---|---|---|
| Change in Elongation at break (%) | −5.6 | −2.9 | −3.7 | −12.2 | −9 | −8.8 | −0.8 |
| Stress at break (%) | −11.4 | −10.3 | −17.5 | −19.0 | −15.6 | −13.6 | −9.1 |
| Absorption weight increase (%) | 5.61 | 5.48 | 5.84 | 8.24 | 7.14 | 7.26 | 6.79 |

The materials prepared in a sequential multistage process (i.e. Ex 3-5 and CompEx 4, 5 and 8) have a more pronounced change in mechanical properties than the blend of LLDPE/LDPE. With regard to absorption weight increase, the inventive examples have the lowest values. Thus, considering both effects (i.e. change in mechanical properties as well as change in weight), the inventive materials offer the best compromise.

Heat deformation

| | Ex 3 | Ex 4 | Ex 5 | Comp 8 | Comp 4 | Comp 5 | Comp 6 |
|---|---|---|---|---|---|---|---|
| Heat deformation 4 h at 115° (%) | 14.9 | 13.1 | 10.6 | 10.9 | 15.4 | 14.6 | 65 |

Crystallization Temperature

In Table 19, crystallization temperatures of Ex 3-5 and CompEx 5 are listed.

TABLE 19

Crystallization temperature

| | Ex 1 | Ex 2 | Ex 3 | CompEx 5 |
|---|---|---|---|---|
| Crystallization temperature (° C.) | 112.7 | 112.9 | 113.3 | 111.6 |

The increase in crystallization temperature is beneficial for processing, e.g. for film applications, since the high molecular weight fraction (iii) acts as a nucleator increasing the crystallization. This is advantageous for the cooling properties after processing the article.

The invention claimed is:

1. A polyethylene composition, comprising a base resin which comprises
   (i) a first fraction which is an ethylene homo- or copolymer, and
   (ii) a second fraction which is an ethylene copolymer, wherein the first fraction (i) has a lower weight average molecular weight than the second fraction (ii), and the base resin has a density of less than 0.940 g/cm$^3$ and a shear thinning index SHI$_{2.7/210}$ of at least 25; and
   wherein the base resin has a melt flow rate MFR$_{21.6\ kg/190°\ C.}$ of more than 40 g/10 min.

2. The polyethylene composition according to claim 1, wherein the base resin has a flow rate ratio FRR$_{21/2}$ of at least 45.

3. The polyethylene composition according to claim 1, wherein the base resin further comprises a third fraction (iii) which is an ethylene homo- or copolymer having a weight average molecular weight which is higher than the weight average molecular weight of the first fraction (i) and is different from the weight average molecular weight of the second fraction (ii).

4. A polyethylene composition, comprising a base resin which comprises
   (i) a first fraction which is an ethylene homo- or copolymer,
   (ii) a second fraction which is an ethylene copolymer, and
   (iii) a third fraction which is an ethylene homo- or copolymer,
wherein the first fraction (i) has a lower weight average molecular weight than the second fraction (ii), the third fraction (iii) has a weight average molecular weight which is higher than the weight average molecular weight of the first fraction (i) and is different from the weight average molecular weight of the second fraction (ii), the base resin has a density of less than 0.940 g/cm$^3$ and a flow rate ratio FRR$_{21/2}$ of at least 45; and
   wherein the base resin has melt flow rate MFR$_{21.6\ kg/190°\ C.}$ of more than 40 g/10 min.

5. The polyethylene composition according to claim 4, wherein the base resin has a shear thinning index SHI$_{2.7/210}$ of at least 25.

6. The polyethylene composition according to claim 1, wherein the fraction (i) has a density of more than 0.931 g/cm$^3$.

7. The polyethylene composition according to claim 1, wherein the base resin has a molecular weight distribution M$_w$/M$_n$ of more than 15.

8. A polyethylene composition, comprising a base resin which comprises
   (i) a first fraction which is an ethylene homo- or copolymer, and
   (ii) a second fraction which is an ethylene copolymer,
wherein the first fraction (i) has a lower weight average molecular weight than the second fraction (ii), the base resin has a density of less than 0.940 g/cm$^3$ and a melt flow rate MFR$_{21.6\ kg/190°\ C.}$ of more than 40 g/10 min, and the fraction (i) has a density of more than 0.931 g/cm$^3$.

9. The polyethylene composition according to claim 8, wherein the base resin has a molecular weight distribution M$_w$/M$_n$ of more than 15.

10. A polyethylene composition, comprising a base resin which comprises
    (i) a first fraction which is an ethylene homo- or copolymer, and
    (ii) a second fraction which is an ethylene copolymer, wherein the first fraction (i) has a lower weight average molecular weight than the second fraction (ii), the base resin has a density of less than 0.940 g/cm$^3$ and the base resin has a molecular weight distribution M$_w$/M$_n$ of more than 15.

11. The polyethylene composition according to claim 10, wherein the fraction (i) has a density of more than 0.931 g/cm$^3$.

12. The polyethylene composition according to claim 10, wherein the base resin has a melt flow rate MFR$_{21.6\ kg/190°\ C.}$ of more than 40 g/10 min.

13. The polyethylene composition according to claim 8, wherein the base resin has a shear thinning index SHI$_{2.7/2.10}$ of at least 25.

14. The polyethylene composition according to claim 8, wherein the base resin further comprises a third fraction (iii) which is an ethylene homo- or copolymer fraction having a weight average molecular weight which is higher than the weight average molecular weight of the first fraction (i) and is different from the weight average molecular weight of the second fraction (ii).

15. The polyethylene composition according to claim 8, wherein the base resin has a flow rate ratio FRR$_{21/2}$ of at least 45.

16. The polyethylene composition according to claim 2, wherein the base resin has a flow rate ratio FRR$_{21/2}$ of more than 70.

17. The polyethylene composition according to claim 1, wherein the fraction (i) has a density of more than 0.935 g/cm$^3$.

18. The polyethylene composition according to claim 4, wherein the third fraction (iii) has a higher weight average molecular weight than the second fraction (ii).

19. The polyethylene composition according to claim 4, wherein the blend of fraction (iii) with fraction (i) has a melt flow rate MFR$_{2.16\ kg/190°\ C.}$ within the range of 20 to 700 g/10 min.

20. The polyethylene composition according to claim 1, wherein the second fraction (ii) has a melt flow rate MFR$_{2.16\ kg/190°\ C.}$ of more than 0.01 g/10 min.

21. A process for preparing the polyethylene composition according to claim 1, comprising the following steps:
    (a) polymerizing ethylene, optionally with at least one alpha-olefin comonomer, to obtain a first ethylene homo- or copolymer fraction (i), and
    (b) polymerizing ethylene with at least one alpha-olefin comonomer to obtain a second polyethylene copolymer fraction (ii), wherein the fractions (i) and (ii) are blended to obtain the base resin.

22. The process according to claim 21, the process being a multistage process wherein the process steps are carried out either in the sequence (a)→(b) or (b)→(a).

23. The process according to claim 21, wherein the process steps (a) and (b) are carried out in the presence of a Ziegler-Natta catalyst.

24. The process according to claim 22, wherein the process step (a) is carried out first in a slurry reactor, followed by process step (b) in a gas phase reactor to obtain a reactor blend of fractions (i) and (ii).

25. The process according to claim 24, further comprising a process step (c) for the preparation of the ethylene homo- or copolymer fraction (iii), wherein step (c) is carried out first in the presence of a Ziegler-Natta catalyst, followed by reaction steps (a) and (b), and the split between step (c) and reaction steps (a) and (b) is from 0.1:99.9 to 10:90.

26. An article, comprising a polyethylene composition according to claim 1.

27. The article according to claim 26, wherein the article is a wire or cable comprising at least one layer which comprises the composition of any of the previous claims, preferably the layer is a jacketing layer.

28. The article according to claim 26, wherein the article is a film.

29. The use of the composition as defined in claim 1 for producing a layer for a wire or cable, preferably for producing a jacketing layer.

30. A method for producing a wire or cable, comprising providing a core element power or information conducting element and one or more layers formed by extrusion, wherein at least one layer is formed from a polymer composition comprising the polyethylene compositions as defined in claim 1.

* * * * *